United States Patent
Skertic

(10) Patent No.: US 10,795,323 B2
(45) Date of Patent: Oct. 6, 2020

(54) SYMBIOTIC CONTROL LOOP

(71) Applicant: Rolls-Royce North American Technologies, Inc., Indianapolis, IN (US)

(72) Inventor: Richard Joseph Skertic, Carmel, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 65 days.

(21) Appl. No.: 16/123,526

(22) Filed: Sep. 6, 2018

(65) Prior Publication Data

US 2020/0081405 A1 Mar. 12, 2020

(51) Int. Cl.
*G05B 7/02* (2006.01)

(52) U.S. Cl.
CPC .................... *G05B 7/02* (2013.01)

(58) Field of Classification Search
CPC ........................................... G05B 7/02
See application file for complete search history.

(56) References Cited

U.S. PATENT DOCUMENTS

| 3,613,020 | A | * | 10/1971 | McBride | ............ | G11C 27/024 |
| | | | | | | 330/1 A |
| 5,148,364 | A | | 9/1992 | Scherer | | |
| 5,303,142 | A | | 4/1994 | Parsons et al. | | |
| 5,452,200 | A | | 9/1995 | Barry | | |
| 7,859,678 | B2 | | 12/2010 | Tazartes et al. | | |
| 2004/0046522 | A1 | * | 3/2004 | Yao | ............ | G05B 7/02 |
| | | | | | | 318/591 |
| 2006/0031001 | A1 | * | 2/2006 | Snowbarger | ............ | G05B 5/00 |
| | | | | | | 701/114 |
| 2012/0181084 | A1 | * | 7/2012 | Pilgrim | ............ | E21B 21/01 |
| | | | | | | 175/57 |
| 2014/0277992 | A1 | | 9/2014 | Myer et al. | | |
| 2014/0303832 | A1 | | 10/2014 | Skertic | | |
| 2016/0010567 | A1 | | 1/2016 | Cline et al. | | |
| 2016/0139584 | A1 | | 5/2016 | Casely et al. | | |
| 2018/0053668 | A1 | | 2/2018 | Mimura | | |
| 2018/0119628 | A1 | | 5/2018 | Zeller et al. | | |
| 2018/0149092 | A1 | | 5/2018 | Zeller et al. | | |

OTHER PUBLICATIONS

Hardy, "Advanced PID Loop Tuning Methods", Apr. 9, 2014, Retrieved from https://www.crossco.com/blog/advanced-pid-loop-tuning-methods, 9 pgs.
Extended European Search Report from counterpart EP application No. 19190200.6 dated Feb. 25, 2020, 5 pgs.

* cited by examiner

*Primary Examiner* — Mark A Connolly
(74) *Attorney, Agent, or Firm* — Shumaker & Sieffert, P.A.

(57) ABSTRACT

In some examples, a method includes determining, by a controller in a system, a result of a first control loop based on a first sensed signal in a first instance and determining, by the controller, a result of a second control loop based on a second sensed signal in a second instance. The method also includes clamping, by the controller, the result of the second control loop to be equal to the result of the first control loop in the first instance and clamping, by the controller, the result of the first control loop to be equal to the result of the second control loop in the second instance. The method further includes outputting, by the controller and to a component of the system, a control signal based on the result of the first control loop.

20 Claims, 5 Drawing Sheets

SYMBIOTIC CONTROL LOOP

GOVERNMENT INTEREST

This invention was made with government support under W911W6-16-2-0011 awarded by the Department of the Army, Aviation Applied Technology Directorate. The government has certain rights in this invention.

TECHNICAL FIELD

This disclosure relates to control systems for machines.

BACKGROUND

A machine (e.g., an engine of a vehicle system) may include a controller configured to control the operations of the machine, and in some cases, the operations of components, such as sensors, actuators, and data collection devices, associated with the machine. The controller may control the operation of a component of the machine based on a sensed feedback signal. For example, the controller may control the operation of an actuator of an engine based on the speed of the engine or the torque of a shaft in the engine. To determine the speed of the engine, the controller can use a control loop using, as an input, a signal from a speed sensor in the engine.

SUMMARY

This disclosure describes methods, systems, and techniques for clamping the result of a secondary control loop to the result of a primary control loop. A controller may be configured to receive two sensed signals and operate a respective control loop based on each respective sensed signal. In some examples, the primary and secondary control loops may be configured to control operation of a single component. When the controller has set the first control loop as the primary control loop, the controller may be configured to clamp the result of the second control loop to the result of the first control loop. When the controller has set the second control loop as the primary control loop, the controller may be configured to clamp the result of the first control loop to the result of the second control loop. In this way, the output of the secondary control loop (which may be actively determining a result but not necessarily outputting that result as a control signal to control the controlled component) follows the output of the primary control loop. Thus, when the controller switches between control loops for controlling the component, the transition between control loops may be smooth and/or continuous.

In some examples, the disclosure describes a method that includes determining, by a controller in a system, a result of a first control loop based on a first sensed signal in a first instance and determining, by the controller, a result of a second control loop based on a second sensed signal in a second instance. The method also includes clamping, by the controller, the result of the second control loop to be equal to the result of the first control loop in the first instance and clamping, by the controller, the result of the first control loop to be equal to the result of the second control loop in the second instance. The method further includes outputting, by the controller and to a component of the system, a control signal based on the result of the first control loop.

In some examples, the disclosure describes a system includes a component and a controller configured to output a control signal to the component. The system also includes a first sensor configured to communicate a first sensed signal to the controller and a second sensor configured to communicate a second sensed signal to the controller, the second sensor being different than the first sensor. The controller is further configured to determine a result of a first control loop based on the first sensed signal in a first instance and determine a result of a second control loop based on the second sensed signal in a second instance. The controller is also configured to clamp the result of the second control loop to be equal to the result of the first control loop in the first instance and clamp the result of the first control loop to be equal to the result of the second control loop in the second instance. The controller is configured to output the control signal based on the result of the first control loop.

In some examples, the disclosure describes a device comprising a computer-readable medium having executable instructions stored thereon, configured to be executable by processing circuitry for causing the processing circuitry to determine a result of a first control loop based on a first sensed signal in a first instance and determine a result of a second control loop based on a second sensed signal in a second instance. The instructions further cause the processing circuitry to clamp the result of the second control loop to be equal to the result of the first control loop in the first instance and clamp the result of the first control loop to be equal to the result of the second control loop in the second instance. The instructions also cause the processing circuitry to output a control signal based on the result of the first control loop.

The details of one or more examples are set forth in the accompanying drawings and the description below. Other features, objects, and advantages will be apparent from the description and drawings, and from the claims.

DETAILED DESCRIPTION

Figure 1:
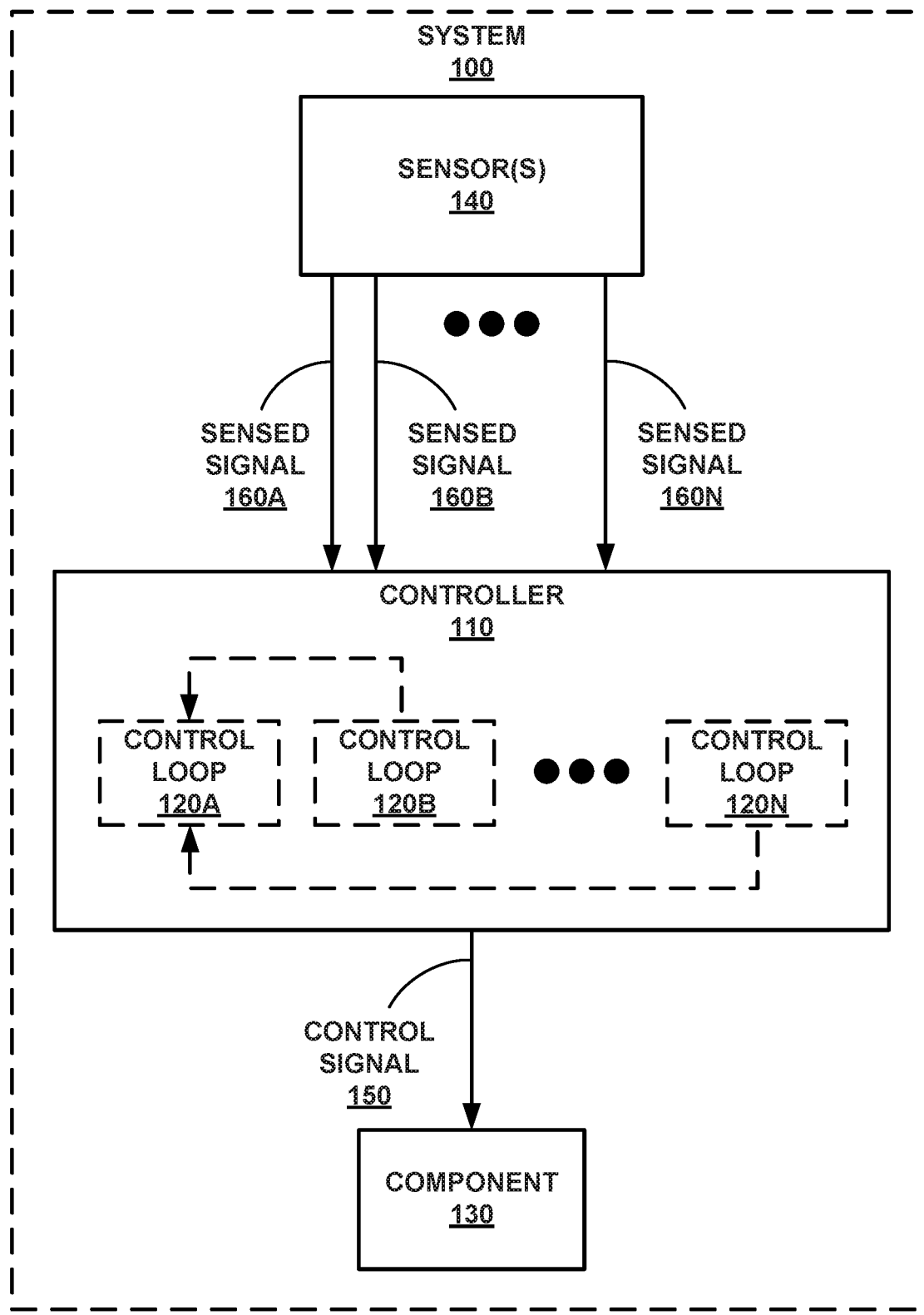
FIG. 1 is a conceptual block diagram illustrating a controller configured to receive sensed signals and output a control signal to a component, in accordance with one or more techniques of this disclosure.

A controller in a system may use two or more control loops to control the operation of a component of the system. The controller may operate each respective control loop based on a respective sensed signal, such as a speed signal, a torque signal, a voltage signal, an electrical current signal, a temperature signal, or the like from the system. The controller may be configured to set one of the control loops as the primary control loop and to cause the other control loop(s) to follow the primary control loop. The controller may clamp the result of each follower control loop to be equal to the result of the primary control loop. In some examples, the controller may be configured to determine the result of a control loop using a minimum value or limit for the control signal and a maximum value or limit for the control signal. In some implementations, to clamp a follower control loop to a primary control loop, the controller may be configured to set the minimum value and the maximum value for the follower control loop to the result of the primary control loop (e.g., to a single value that is the result of the primary control loop). Clamping the result of a follower control loop to be equal to the result of a primary control loop can prevent windup of the follower control loop upon switching the follower control loop to be the primary control loop.

The controller may be configured to switch between control loops when controlling the operation of the component. For example, the controller may set a first control loop as the primary control loop during a first operating mode and set a second control loop as the primary control loop when the controller switches to a second operating mode. For controllers that don't clamp control loops in accordance with techniques of this disclosure, the switch-over between operating modes may cause a jump or a discontinuity in the result of the control loop(s) and, accordingly, a jump or discontinuity in the control signal output to the component being controlled. Alternatively, some controllers may implement reset logic to ensure that an amplitude of the output signal has a smooth transition. The reset logic of the other controller may be relatively complex and burdensome to account for all possible situations and may be susceptible to windup or runaway. However, using the techniques of this disclosure, the results of the control loops may be continuous over time without any jumps or discontinuities when the controller switches between control loops and without the complexity of reset logic.

One example application of a controller with two or more control loops is a tiltrotor aircraft. A controller may be configured to output one or more control signals to control the operation of components in the propulsion system of the tiltrotor aircraft. For example, the controller can output control signals to motors, actuators, fuel valves, and/or other components to control the speed, torque, flux position, fuel flow rate, and/or other parameters in the system. When the rotor transitions from turbo-propulsor mode to turbo-fan mode, or vice versa, the controller may be configured to switch from a first control loop to a second control loop, where the controller uses the first control loop for, e.g., turbo-propulsor mode, and the controller uses the second control loop for, e.g., turbo-fan mode. To create a smooth transition between turbo-propulsor mode and turbo-fan mode, the controller can clamp the result of the follower control loop to be equal to the result of the primary control loop. Thus, a switch-over between control loops may result in no jumps or discontinuities in the result of either control loop.

FIG. 1 is a conceptual block diagram illustrating a controller 110 configured to receive sensed signals 160A-160N and output a control signal 150 to a component 130, in accordance with one or more techniques of this disclosure. System 100 includes controller 110, component 130, sensor(s) 140, and other optional components not shown in FIG. 1, such as an engine, a motor, an alternator or generator, a drive shaft, and/or a memory device. In some examples, a single controller (e.g., controller 110) may be configured to control operations of one or more components by outputting additional control signals, or system 100 may include more than one controller.

In some examples in which system 100 includes an engine or a motor, the mechanical power created by the engine or motor may be used in a variety of ways or for a variety of systems and applications (e.g., aircraft, automobiles, locomotives, marine craft, power plants, electric generators, and any or all other systems and applications that rely on mechanical energy from an engine to perform work). For example, system 100 may be configured to generate propulsion by converting fuel or electrical power to mechanical power. In some examples, system 100 may include a turbine, a shaft, a compressor, a combustor, a generator, and/or any other internal components for generating propulsion and/or electricity. System 100 may include the following types of engines: a gas turbine engine, a nuclear turbine engine, a steam turbine engine, internal combustion engine, Wankel engine, diesel engine, rotary engine, and/or any other suitable propulsor engine.

Figure 2:
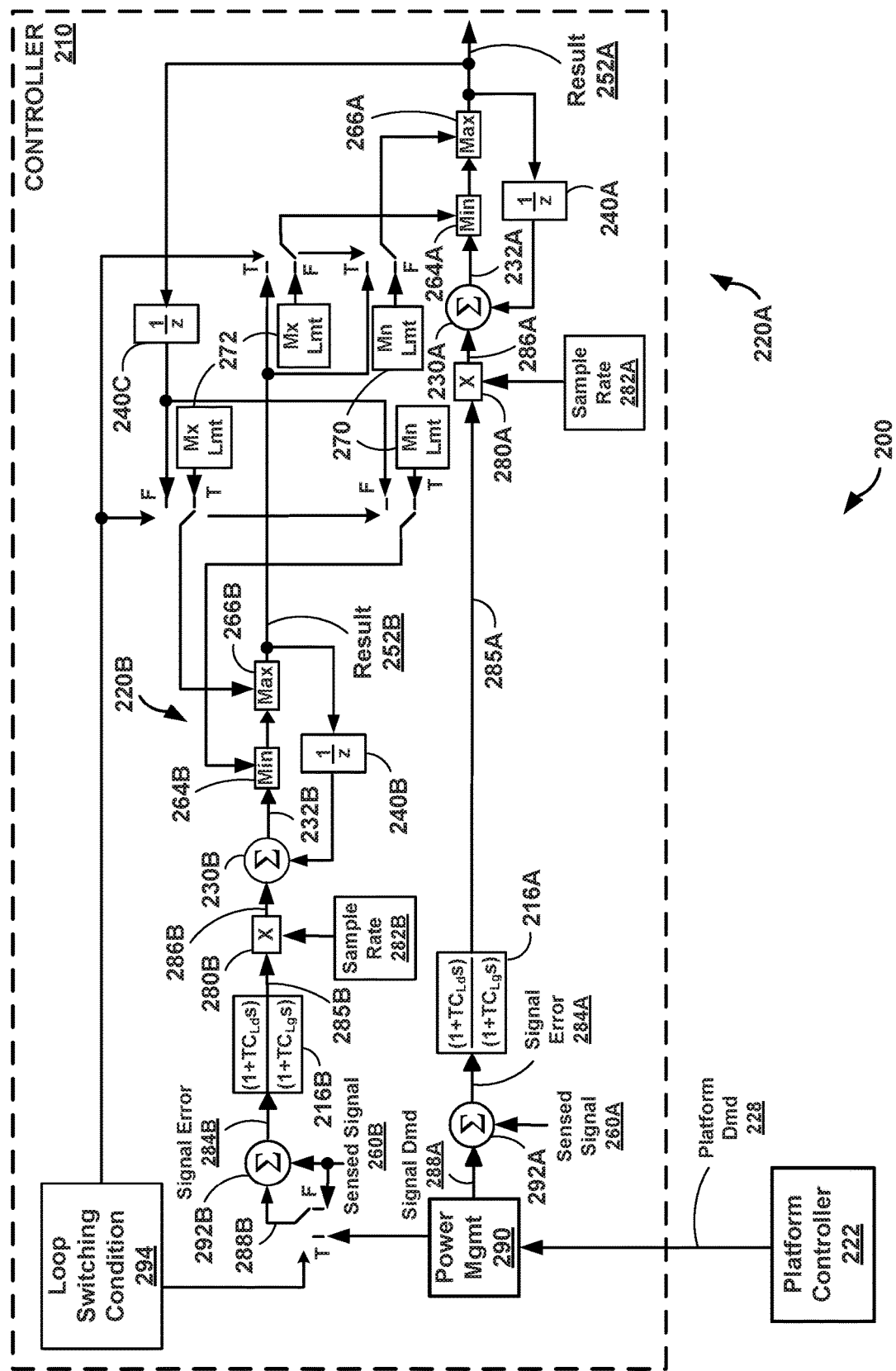
FIG. 2 is a conceptual diagram illustrating two control loops with discrete integrators, in accordance with one or more techniques of this disclosure.
Figure 3:
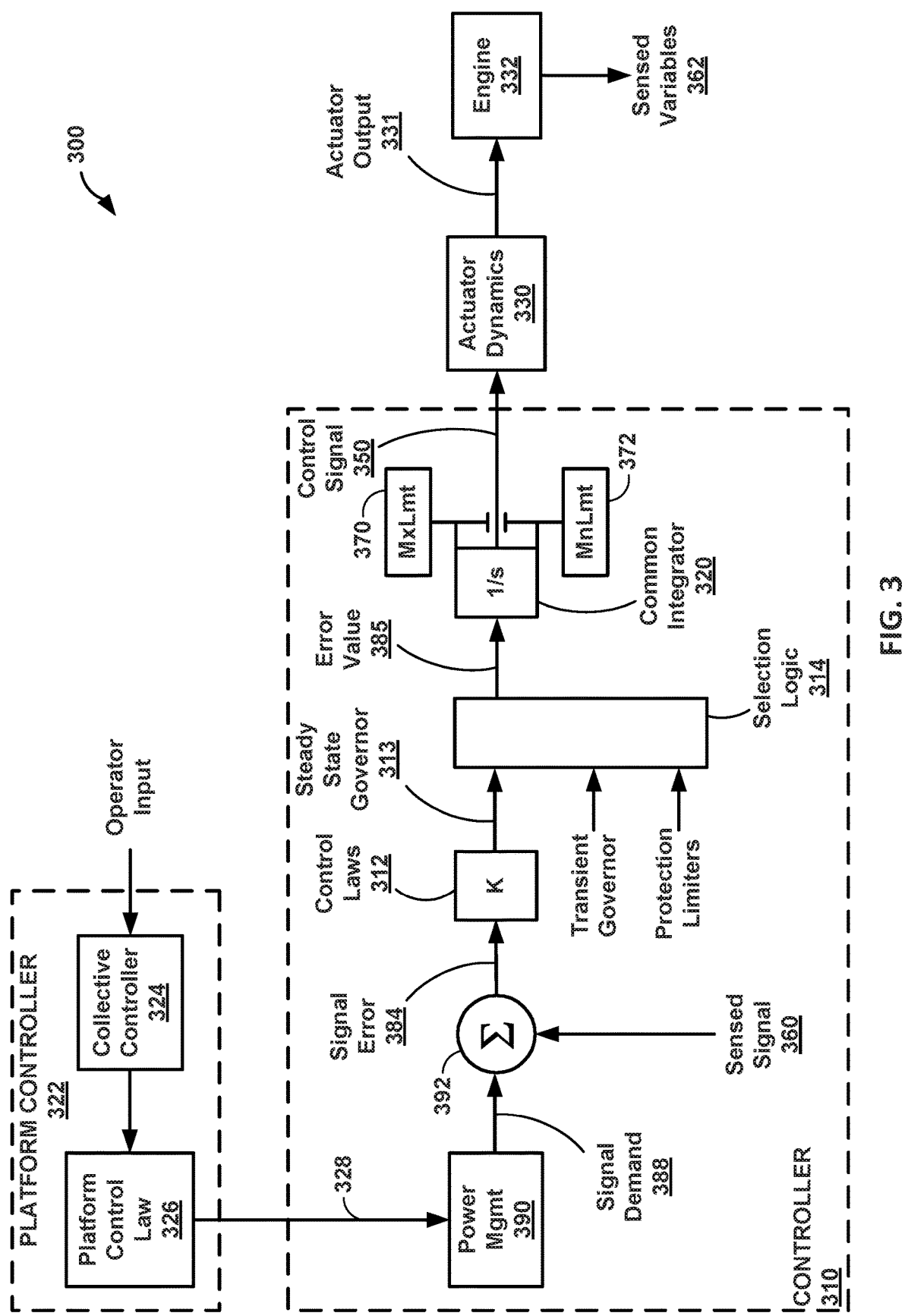
FIG. 3 is a conceptual diagram illustrating an engine platform controller and an engine propulsion controller, in accordance with one or more techniques of this disclosure.

In some examples, system 100 is a vehicle, and controller 110, component 130, and sensor(s) 140 may be mounted on or within the vehicle. For example, system 100 may include a turbine engine mounted as a center engine on an aircraft, a marine vehicle, or a tank. In some examples, system 100 may include a turbine engine mounted on a wing of an aircraft or a marine vehicle. In examples in which the vehicle includes more than one engine, controller 110 may be a central controller configured to control the operations of all of the engines mounted on the vehicle, or controller 110 may be configured to control the operations of only one engine or fewer than all of the engines. Systems 200 and 300 shown in FIGS. 2 and 3 are examples of system 100.

Component 130 may be configured to operate based on control signal 150 received from controller 110. Component 130 may include a motor, an actuator, a fuel valve, a fuel pump, and/or any other component. In examples in which component 130 is a motor, for example, controller 110 may be configured to control the flux position, the rotational speed, and/or torque of the motor based on control signal 150. In examples in which component 130 is an actuator, controller 110 may be configured to control the angle of a rotor by controlling the actuator. Actuator dynamics 330 shown in FIG. 3 is an example of component 130.

Sensor(s) 140 may be configured to communicate sensed signal(s) 160A-160N to controller 110. A first sensor of sensor(s) 140 may be configured to sense the rotational speed of component 130 and communicate sensed signal 160A indicating the rotational speed to controller 110. In some examples, sensor(s) 140 may be located outside of system 100. In examples in which controller 110 is operating N control loops (where N is an integer), controller 110 may be configured to receive N sensed signals from N sensors 140, where each of sensors 140 communicates one of sensed signals 160A-160N to controller 110.

Sensor(s) 140 may be configured to monitor parameters of system 100, such as the position of component 130, the position of another element, temperature, pressure, electrical current or voltage, electromagnetic signals, acoustic signals, and/or any other parameters. Each of sensed signal(s) 160A-160N may be a feedback signal from component 130, another part of system 100, or component outside of system 100. Sensed signals 260A, 260B, and 360 shown in FIGS. 2 and 3 are examples of sensed signals 160A-160N.

Controller 110 may be configured to determine a result of control loop 120A based on sensed signal 160A in a first instance when control loop 120A is the primary control loop. Controllers 210 and 310 shown in FIGS. 2 and 3 are examples of controller 110. Controller 110 may be configured to determine a result of control loop 120B based on sensed signal 160B in a second instance when control loop 120B is the primary control loop. Controller 110 may be configured to implement control loops 120A and 120B in an open-loop format, a closed-loop format, and/or a combination of an open-loop format and a closed-loop format. In some examples, controller 110 determines the result of the primary control loop based on the respective sensed signal without any consideration for the sensed signals of the follower control loops. Thus, controller 110 can implement the primary control loops as a single-input, single-output control loop.

FIG. 1 depicts control loop 120A as the primary control loop and control loops 120B and 120N as secondary control loops. Thus, FIG. 1 shows an example of the first instance in which controller 110 has clamped the results of control loops 120B and 120N to the result of control loop 120A. In some examples, controller 110 sets control loop 120B or 120N as the primary control loop and sets the other control loops, including control loop 120A, as secondary control loops. Control loops 220A and 220B shown in FIG. 2 and common integrator 320 shown in FIG. 3 are examples of control loops 120A-120N.

Controller 110 may be configured to set one of control loops 120A-120N as the primary control loop and the other(s) of control loops 120A-120N as secondary control loop(s). This disclosure may refer to the primary and secondary control loops as active and inactive control loops, respectively, with the understanding that the secondary control loop(s) may be configured to actively determine result(s), even though the result(s) of the secondary control loop(s) may be clamped to the result of the primary control loop and not necessarily actively used to control component 130. This disclosure may also refer to the primary and secondary control loops as master and slave control loops, leader and follower control loops, unlocked and locked control loops, and unclamped and clamped control loops, because the secondary control loops follow the primary control loop and may be locked and/or clamped to the primary control loop.

When control loop 120A is primary, controller 110 may be configured to determine an error value based on a difference between the actual value for sensed signal 160A and a target value for sensed signal 160A. The controller may be configured to determine the result of control loop 120A by adding the error value to a previous result of control loop 120A. Controller 110 may be further configured to determine the result of control loop 120A by applying a minimum value and a maximum value for sum of the error value and the previous result of control loop 120A. This type of control loop may be referred to as a closed-loop Euler integrator with a unit delay. Controllers 210 and 310 shown in FIGS. 2 and 3 are examples illustrating additional details of how controller 110 can implement two or more control loops.

Controller 110 may include any suitable arrangement of hardware, software, firmware, or any combination thereof, to perform the techniques attributed to controller 110 herein. Controller 110, as well as controllers 210 and 310, may also include one or more processors, which may be referred to as "processing circuitry." Examples of controller 110 include any one or more microprocessors, digital signal processors (DSPs), application specific integrated circuits (ASICs), full authority digital engine control (FADEC) units, engine control units (ECUs), field programmable gate arrays (FPGAs), and/or any other equivalent integrated or discrete logic circuitry, as well as any combinations of such components. When controller 110 includes software or firmware, controller 110 further includes any necessary hardware for storing and executing the software or firmware, such as one or more processors or processing units. In some examples, controller 110 may be integrated with the control unit for propulsor engine 110, which may include a FADEC unit.

In general, a processing unit may include one or more microprocessors, DSPs, ASICs, FPGAs, or any other equivalent integrated or discrete logic circuitry, as well as any combinations of such components. Although not shown in FIG. 1, controller 110 may include a memory device configured to store data. The memory device may include any volatile or non-volatile media, such as a random access memory (RAM), read only memory (ROM), non-volatile RAM (NVRAM), electrically erasable programmable ROM (EEPROM), flash memory, and the like. In some examples, the memory device may be external to controller 110 (e.g., may be external to a package in which controller 110 is housed).

In accordance with the techniques of this disclosure, when control loop 120A is the primary control loop in the first instance (as shown in FIG. 1), controller 110 may be configured to clamp the result of control loop 120B to be equal the result of control loop 120A. In the second instance when control loop 120B is the primary control loop, controller 110 may be configured to clamp the result of control loop 120A to be equal the result of control loop 120B. Thus, controller 110 may be configured to continually set the result of the secondary (or follower) control loop to be equal to the result of the primary control loop. When controller 110 switches from the primary control loop to the secondary (or follower) control loop, the transition in the results of both control loops may be smooth and/or continuous. In addition, the transition in the amplitude of control signal may be smooth/or and continuous.

Controller 110 may be configured to output control signal 150 to component 130 based on the result of control loop 120A. In examples in which control loop 120A is the primary control loop, controller 110 can determine the result of control loop 120A based on the sensed signal 160A. In examples in which control loop 120B is the primary control loop, controller 110 can determine the result of control loop 120A based on the result of control loop 120B. In examples in which controller 110 is clamping the result of the follower control loop to the result of the primary control loop, then the results of the two control loops will be equal.

Controller 110 may be configured to generate control signal 150 based on the result of control loop 120A. In some examples, controller 110 is configured to generate control signal 150 based on the result of the control loop that has been set as the primary control loop. In examples in which controller 110 has clamped the results of the secondary control loops to the result of the primary control loop, controller 110 can generate control signal 150 based on the result of any of the control loops because the results of all of the control loops will be equal. Thus, controller 110 may be configured to generate control signal 150 based on the result of one control loop, which may be the primary control loop or a secondary control loop. Controller 110 may be configured to determine results of the other control loop(s) but not necessarily to generate control signal 150 based on the results of the other control loop(s). Control signal 350 shown in FIG. 3 is an example of control signal 150.

In some examples, controller 110 may be configured to use the result of a secondary control loop as an input to the primary control loop such that the result of the primary control loop is equal to the result of the secondary control loop. Thus, in effect, controller 110 can make a secondary control loop operate as the leading control loop. In this way, even though controller 110 may be configured to use the result of the primary control loop to generate and output control signal 150 to component 130, the result of the primary control loop may effectively follow the result of a secondary control loop.

In some examples, controller 110 may be configured to use the result of control loop 120A, or any other control loop, to generate and output control signal 150 regardless of whether control loop 120A is the primary control loop. In other examples, controller 110 may be configured to use the result of the primary control loop to generate and output control signal 150. Thus, when controller 110 changes the primary control loop, controller 110 may be configured to use the result of the new primary control loop to generate and output control signal 150.

As described herein, controller 110 may establish a primary control loop by clamping the results of all other control loops to the result of the primary control loop. Controller 110 can set a primary control loop by setting a loop switching condition, such as loop switching condition 294 shown in FIG. 2, to a value corresponding to the respective control loop. Controller 110 may be configured to use the result of the primary control loop as the minimum limit and the maximum limit for each of the secondary control loops. In some examples, by setting a primary control loop, however, controller 110 may not necessarily directly use the result of the primary control loop to generate and output control signal 150 but may instead use the result of a secondary control loop to generate and output control signal 150. FIG. 2 shows an example in which controller 210 uses result 252A of control loop 220A to generate and output a control signal even if control loop 220A is a secondary control loop. In other examples, setting the primary control loop also changes the output signal which controller 110 uses as control signal 150. For example when switching the primary control loop from control loop 120A to control loop 120B, controller 110 may switch from using the output of control loop 120A as control signal 150 to using the output of control loop 120N as control signal 150.

In contrast to clamping secondary (or follower) control loops to the primary control loop, as is done in the current disclosure, other controllers may use reset logic to create smooth transitions between control loops. Reset logic may be relatively complex, as compared to clamping the result of a follower control loop to the result of a primary control loop. For example, if another controller receives sensed signals for speed and torque, the controller may set the result of the speed control loop to the same torque equivalent at the time that the controller switches from the torque control loop to the speed control loop. To do so, the controller calculates the torque equivalent, the speed, and the load at the time of the switch-over. Between switch-overs, the secondary control loop can wind up. The controller may need to unwind the secondary control loop before switching over. Moreover, the reset logic may not capture all of the switch-over cases, which can result in a jump or a discontinuity in the control signal if the controller switches control loops in a case that is not captured in the reset logic.

FIG. 2 is a conceptual diagram illustrating two control loops 220A and 220B with discrete integrators 240A-240C, in accordance with one or more techniques of this disclosure. In the example of FIG. 2, controller 210 is configured to operate two control loops 220A and 220B based on respective sensed signals 260A and 260B. Controller 220 may be configured to operate control loops 220A and 220B based on platform demand 228 received from platform controller 222 and loop switching condition 294.

Platform controller 222 may be configured to receive an operator input or another system command input. The input can indicate a desired thrust, power, speed, angle, position, torque, operating mode, and/or any other parameter for system 200 or a component of system 200. Platform controller 222 can be a higher-level control system such as an airframe controller for a system 200 which includes an aircraft. Platform controller 222 is configured to output platform demand 228 to power management 290 within controller 210. Platform demand 228 may indicate the desired thrust, power, speed, angle, torque, and/or any other parameter for system 200 or a component of system 200. Platform controller 222 may generate platform demand 228 using a protocol for communications between controllers 210 and 222.

Power management 290 may be configured to generate signal demands 288A and 288B based on platform demand 228 received from platform controller 222. Power management 290 can generate signal demands 288A and 288B as target values for sensed signals 260A and 260B, respectively. Thus, power management 290 may be configured to determine a desired value for operation of the component which will result in a desired value of sensed signal 260A based on platform demand 228 and to generate signal demand 288A for operation of the component which will result in a desired value of sensed signal 260A.

For example, power management 290 may be configured to receive platform demand 228 indicating a desired operating condition (e.g., speed or torque) for a component of system 200. Controller 210 may be configured to receive sensed signal 260A from a speed sensor, where the amplitude of sensed signal 260A indicates a speed of the component of system 200. Power management 290 may be configured to generate signal demand 288A with a value and/or an amplitude equal to the expected amplitude of sensed signal 260A when the component has the desired operating condition (e.g., speed).

Adder 292A receives signal demand 288A and sensed signal 260A and determines a difference between signal demand 288A and sensed signal 260A and outputs the difference as signal error 284A. In some examples, adder 292A may be configured to operate as a subtractor by outputting signal error 284A with a value of zero when the component has the desired operating condition (e.g., speed), as represented by sensed signal 260A. Power management 290 may also be configured to generate signal demand 288B with a value and/or an amplitude equal to the expected amplitude of sensed signal 260B when the component has the desired operating condition (e.g., torque). In some examples, a torque sensor may generate and deliver sensed signal 260B to controller 210, and power management 290 may be configured to generate signal demand 288B to have a value equal to the expected value of sensed signal 260B at the desired torque.

Adder 292A may be configured to generate signal error 284A indicating the difference between sensed signal 260A and signal demand 288A. Thus, a positive or negative value of signal error 284A indicates that the operating condition of the component of system 200 deviates from the desired operating condition, and larger magnitudes indicate larger deviation. Controller 210 may be configured to apply control laws to signal error 284A at block 216A to generate error value 285A based on signal error 284A. Block 216A may represent the compensation for control loop 220A and may be part of the control laws of control loop 220A to maintain stable operation of control loop 220A. Controller 210 may be configured to operate on signal error 284A in conjunction with integrator 240A.

Multiplier 280A may be configured to generate multiplied error value 286A based on error value 285A and sample rate 282A. Multiplied error value 286A may be a version of error value 285A weighted based on sample rate 282A. Sample rate 282A may represent the length of time between iterations of control loop 220A (e.g., one millisecond, five milliseconds, or ten milliseconds). Thus, for a higher sample rate 282A (e.g., on the order of kilohertz or megahertz), controller 210 may be configured to apply a smaller weight to each sample of error value 285A. Error value 385 shown in FIG. 3 is an example of error value 285A. As such, a high sample rate 282A may result in a smaller value for multiplied error value 286A. Controller 210 can use multiplied error value 286A as an input to first control loop 220A at adder 230A.

First control loop 220A includes adder 230A, integrator 240A, minimum block 264A, and maximum block 266A. Similarly, second control loop 220B includes adder 230B, integrator 240B, minimum block 264B, and maximum block 266B. The elements of control loop 220A and the operation of control loop 220A may be similar to or the same as the elements of control loop 220B and the operation of control loop 220B, e.g., aside from the sensed signals 260A and 260B on which the control loop 220A and 220B operate. In some examples, control loop 220B may also operate based on different control laws than control loop 220A. In some examples, controller 210 may be configured to operate more than two control loops, even though FIG. 2 depicts only two control loops.

For each iteration of control loop 220A, controller 210 may be configured to determine a value for result 252A. Result 252A can have the same value and/or amplitude as a control signal (see, e.g., control signals 150 and 350 shown in FIGS. 1 and 3) generated and outputted by controller 210. For example, controller 210 may be configured to output the control signal (e.g., result 252A) to an actuator, where the operation of the actuator is based on a characteristic of the control signal, such as the amplitude, frequency, phase, and/or duty cycle of the control signal.

Integrator 240A may be a unit delay that creates a discrete integrator and/or an Euler integrator such that controller 210 generates an output of integrator 240A based on the previous value (e.g., a previous instance) of result 252A, as shown in Equation (1). Although Equations (1)-(5) are described with respect to the elements of control loop 220A, controller 210 may also be configured to operate control loop 220B using Equations (1)-(5).

$$(\text{Output of block } 240A)_i = \text{Result}_{i-1} \quad (1)$$

Adder 230A can operate as an adder or a subtractor (e.g., by adding a first input to a negative value of a second input). Controller 210 may be configured to determine an output of adder 230A (e.g., unbounded result 232A) based on the output of integrator 240A and multiplied error value 286A. Controller 210 may be configured to add the previous value of result 252A ($\text{Result}_{i-1}$) and multiplied error value 286A, as shown in Equation (2). In examples in which multiplied error value 286A is equal to zero (e.g., when the sensed signal is equal to the target value), controller 210 may set unbounded result 232A equal to the previous instance of result 252A.

$$\text{Unbounded result}_i = \text{Error value}_i + \text{Result}_{i-1} \quad (2)$$

Controller 210 may be configured to compare unbounded result 232A to a maximum limit 270 and a maximum limit 272 at minimum block 264A and maximum block 266A, respectively. Result 252A may be equal to unbounded result 232A if the value of unbounded result 232A is between maximum limit 270 and minimum limit 272. If unbounded result 232A is greater than maximum limit 270, controller 210 is configured to determine the output of minimum block 264A as equal to maximum limit 270. Thus, controller 210 is configured to determine the output of minimum block 264A as equal to the lesser of (e.g., the minimum of) unbounded result 232A and maximum limit 270, as shown in Equation (3). Controller 210 is configured to determine the output of maximum block 266A as equal to the greater of (e.g., the maximum of) the output of minimum block 266A and minimum limit 272, as shown in Equation (4).

$$\text{Output of block } 260A = \min(\text{unbounded result } 232A, \text{maximum limit}) \quad (3)$$

$$\text{Output of block } 262A = \max(\text{output of block } 260A, \text{minimum limit}) \quad (4)$$

In this way, controller 210 may be configured to cap result 252A at limits 270 and 272, as shown in Equation (5), which is a nested form of Equations (3) and (4).

$$\text{Result } 252A = \max(\text{minimum limit}, \min(\text{unbounded result}, \text{maximum limit}),) \quad (5)$$

Limits 270 and 272 are saturation points, such that controller 210 may be configured to not allow result 252A to have a value greater than maximum limit 270 or a value less than minimum limit 272. In some examples, limits 270 and 272 can represent actual, physical limits in the operation of a component in a system such as the maximum and minimum displacements or angles of an actuator, the maximum and minimum fuel flow rates for a fuel pump, the maximum and minimum torques in a motor or a shaft, the maximum and minimum speeds for a motor, propulsor, shaft, or engine, and/or any other limits for the operation of a component.

Like first control loop 220A, for each iteration of second control loop 220B, controller 210 may be configured to determine a value for a result 252B. Controller 210 may be configured to directly output result 252A or 252B as a control signal, or controller 210 may be configured to generate and output a control signal that is separate from and based on result 252A or 252B. In the example of FIG. 2, controller 210 uses result 252A to generate a control signal even in examples where second control loop 220B operates as the primary control loop due to the connections between first control loop 220A and second control loop 220B.

Integrator 240B may be a unit delay that creates a discrete integrator and/or a Euler integrator such that controller 210 generates an output of integrator 240B based on the previous value (e.g., a previous instance) of result 252B, as shown in Equation (1) above. Controller 210 may be configured to determine an output of adder 230B (e.g., unbounded result 232B) based on the output of integrator 240B and multiplied error value 286B. Controller 210 may be configured to add the previous value of result 252B ($\text{Result}_{i-1}$) and multiplied error value 286b, as shown in Equation (2).

Controller 210 can determine multiplied error value 286B based on sample rate 282B and error value 285B, where error value 285B may be based on the difference between sensed signal 260B received by controller 210 from a sensor and a target value for the sensed signal. In examples in which multiplied error value 286B is equal to zero (e.g., when the sensed signal is equal to the target value), controller 210 may set unbounded result 232B equal to the previous instance of result 252B.

For each iteration of control loop 220B, controller 210 may be configured to determine a value for result 252B. Result 252B may be equal to unbounded result 232B if the value of unbounded result 232B is between maximum limit 270 and minimum limit 272. Controller 210 is configured to determine the output of minimum block 264B as equal to the lesser of (e.g., the minimum of) unbounded result 232B and maximum limit 270, as shown in Equation (3) above. Controller 210 is configured to determine the output of maximum block 266B as equal to the greater of (e.g., the maximum of) the output of minimum block 266B and minimum limit 272, as shown in Equation (4) above.

Control loops 220A and 220B are linked through integrator 240C, minimum blocks 264A and 264B, and maximum blocks 266A and 266B. Controller 210 may be configured to set first control loop 220A as the primary control loop and set second control loop 220B as a secondary control loop in a first instance (e.g., when loop switching condition 294 has a False value). Controller 210 may also be configured to set control loop 220B as the primary control loop and set control loop 220 as a secondary control loop in a second instance (e.g., when loop switching condition 294 has a True value). In some examples, controller 210 can establish more than two control loops, where controller 210 operates each control loop based on a respective sensed signal.

Controller 210 may be configured to set control loop 220A or 220B as the primary control loop based on loop switching condition 294. In the example of FIG. 2, loop switching condition 294 is a Boolean condition with two values (e.g., True or False, high or low, one or zero, etc.). In examples in which controller 210 operates more than two control loops, loop switching condition 294 can have more than two possible values.

In examples in which loop switching condition 294 has a True value, each of the switches illustrated in FIG. 2 is set to the T junction. In such a configuration, controller 210 is configured to clamp result 252A of first control loop 220A to be equal to result 252B of second control loop 220B, thereby causing result 252A to follow the result of result 252B and second control loop 220B being considered the primary control loop. In examples in which loop switching condition 294 has a False value, each of the switches illustrated in FIG. 2 is set to the F junction. In such a configuration, controller 210 may be configured to clamp result 252B of second control loop 220B to be equal to result 252A of first control loop 220A, thereby causing result 252B to follow the result of result 252A and first control loop 220A being considered the primary control loop.

In examples in which loop switching condition 294 has a True value and each of the switches illustrated in FIG. 2 is set to the T junction, controller 210 is configured to clamp result 252A of first control loop 220A to be equal to result 252B of second control loop 220B by using result 252B of second control loop 220B as the limits for min block 264A and max block 266A. Thus, in response to determining that the output of adder 230A of first control loop 220A is greater than or less than result 252B of second control loop 220B at min block 264A or max block 266A, controller 210 may be configured to set result 252A of first control loop 220A to be equal to result 252B of second control loop 220B. In examples in which loop switching condition 294 has a True value, controller 210 may be configured to determine result 252B by using limits 270 and 272 for blocks 264A and 266A.

Controller 210 may use limits 270 and 272 for both of control loops 220A and 220B such that controller 210 is configured to determine a result of the primary control loop based on limits 270 and 272. For example, in examples in which loop switching condition 294 has a True value, controller 210 may be configured to use limits 270 and 272 for minimum block 264A and maximum block 266A and use result 252B for minimum block 264B and maximum block 266B. In examples in which loop switching condition 294 has a False value, controller 210 may be configured to use a previous value of result 252A through integrator 240C for minimum block 264A and maximum block 266A and use limits 270 and 272 for minimum block 264B and maximum block 266B. Integrator 240C may create a unit delay for result 252A and deliver the delayed value of result 252A to the switches of control loop 220B. Limits 370 and 372 are examples of limits 270 and 270 that controller 220 can use in minimum blocks 264A and 264B and maximum blocks 266A and 266B.

However, limits 270 and 272 are not necessarily the same for each of control loops 220A and 220B in every example. In some examples, controller 210 uses a first set of limits for control loop 220A and a second set of limits for control loop 220B. In examples in which system 200 includes a tiltrotor aircraft, controller 210 may be configured to set control loop 220A as the primary control loop for a turbo-propulsor mode and control loop 220B as the primary control loop for a turbo-fan mode. An actuator of system 200 may have a first minimum limit and a first maximum limit for the turbo-propulsor mode and a second minimum limit and a second maximum limit for the turbo-fan mode. For example, the minimum limits and the maximum limits may correspond to angles of a rotor controlled by the actuator, such that actuator maintains the rotor between a first minimum angle and a first maximum angle in the turbo-propulsor mode and between a second minimum angle and a second maximum angle in the turbo-fan mode.

In examples in which loop switching condition 294 has a False value, controller 210 may be configured to clamp result 252B to be equal to result 252A by using result 252A as the limits for blocks 264B and 266B. Thus, in response to determining that the output of adder 230B is greater than or less than result 252A at block 264B or 266B, controller 210 may be configured to set result 252B to be equal to result 252A. In examples in which loop switching condition 294 has a True value, controller 210 may be configured to determine result 252A by using limits 270 and 272 for blocks 264B and 266B.

In examples in which loop switching condition 294 has a False value, controller 210 may be configured to set signal error 284B to be equal to zero by setting both inputs to adder 292B equal to sensed signal 260B. Thus, controller 210 may be configured to determine the output value of adder 230B to be equal to the previous value or result 252B when control loop 220B is a secondary control loop. In examples in which loop switching condition 294 has a True value, controller 210 may be configured to set signal error 284A to be equal to zero by setting both inputs to adder 292A equal to sensed signal 260A.

In examples in which controller 210 operates a third control loop, controller 210 may be configured to determine a result of the third control loop based on a third sensed signal. In examples in which loop switching condition 294 is equal to a first value, controller 210 may be configured to clamp result 252B and the result of the third control loop to be equal to result 252A. In examples in which loop switching condition 294 is equal to a second value, controller 210 may be configured to clamp result 252A and the result of the third control loop to be equal to result 252B. In examples in which loop switching condition 294 is equal to a third value, controller 210 may be configured to clamp results 252A and 252B to be equal to the result of the third control loop. Such an example may be extended to any number of control loops.

In examples in which loop switching condition 294 changes values (e.g., from True to False, or from False to True), controller 210 may be configured to change which of control loops 220A and 220B is set as the primary control loop. In examples in which loop switching condition 294 changes values, controller 210 may be configured to output a control signal based on result 252A with a continuous transition between amplitudes over the transition time, since the output 252A or 252B of the control loop of control loops 520A and 520B that is the follower is clamped to the other output. In other words, controller 210 may be configured to output a control signal based on result 252A with a smooth transition (e.g., without any resets or jumps in amplitude or value) when loop switching condition 294 changes values.

Thus, the hand-off between control loops 220A and 220B may be smooth without using complex reset logic. Moreover, by clamping the results of the secondary control loops, controller 210 can prevent the results of the secondary control loops from winding up or running away.

FIG. 3 is a conceptual diagram illustrating an engine platform controller 322 and an engine propulsion controller 310, in accordance with one or more techniques of this disclosure. Engine propulsion controller 310 may implement two or more control loops, like controller 210 of FIG. 2, although only a single control loop is illustrated for clarity. Platform controller 322 is configured to receive an operator input, such as a thrust control or a desired speed from the operator of system 300. Platform controller 322, via collective controller 324 and platform control law 326, may be configured to output a platform demand value 328 to power management 390 of controller 310. Platform controller 222 shown in FIG. 2 are examples of platform controller 322. In some examples, platform controller 322 is an airframe controller configured to receive inputs from a system operator (e.g., a driver or a pilot) and/or signals indicative of environmental conditions.

The single control loop illustrated in FIG. 3 may be configured to generate signal demand 388 using power management 390, which is an example of a target value for sensed feedback signal 360. Controller 310 may be configured to determine signal error 384 (e.g., the output of subtractor 392) using adder 392 at least in part by determining a difference between signal demand 388 and sensed signal 360. Signal demand 388 is an example of target value for sensed signal 360. Signal demand 388 may be similar to or substantially the same as signal demands 288A and 288B shown in FIG. 2. In examples in which sensed signal 360 is equal to signal demand 388, controller 310 may be configured to determine signal error 384 equal to zero. In examples in which signal error 384 is equal to zero, controller 310 may be configured to determine a result of common integrator 320 that is equal to the previous result of common integrator 320.

Controller 310 may be configured to determine steady state governor value 313 based on signal error 384 and control laws 312. Control laws 312 can include common integrator 320 to compensation for signal error 384, which can include proportional and integrator (PI) control laws. Controller 310 may be configured to determine an input value for common integrator 320 based on steady state governor value 313, selection logic 314, a transient governor value, and protection limiter values. Through selection logic 314, controller 310 may be configured to determine which control loop is the active control loop depending on signal error 384. Controller 310 may be configured to select the active control loop on a priority basis. Thus, the transient governor and the protection limiters can, in effect, take over control if system 300 experiences a condition change. Controller 310 may be configured to use the protection limiters to protect against physical limits to keep operation within design constraints.

Controller 310 may be configured to use the transient governors to move system 300 between conditions within system constraints. Thus, when transitioning between a first condition X and a second condition Y, controller 310 may determine control signal 350 to increase or decrease the power and/or thrust as fast as possible, but controller 310 may have constraints such as surge, margin, and so on. Controller 310 may be configured to us protection limiters to implement system constraints such as maximum turbine inlet temperature or maximum case pressure.

Common integrator 320 can include a discrete integrator such as integrator 240 shown in FIG. 2, an adder such as adder 230 shown in FIG. 2, and maximum and minimum blocks for limits 370 and 372 such as blocks 264A, 266A, 264B, and 266B shown in FIG. 2. Controller 310 may be configured to determine the result of common integrator 320 based on error value 385 and limits 370 and 372. Controller 310 may be configured to output control signal 350 based on the result of common integrator 320 to actuator dynamics 330.

Actuator dynamics 330 may be configured to move and/or control a mechanism of engine 332 based on control signal 350 received from controller 310. Actuator output 331 may affect the performance of engine 332, such as the speed or angle of a rotor or shaft, the operation of a solenoid, or the position or status of a valve. System 300 may include a sensor configured to sense one or more variables 362 in engine 332 and deliver sensed signal 360 to controller 310.

Figure 4:
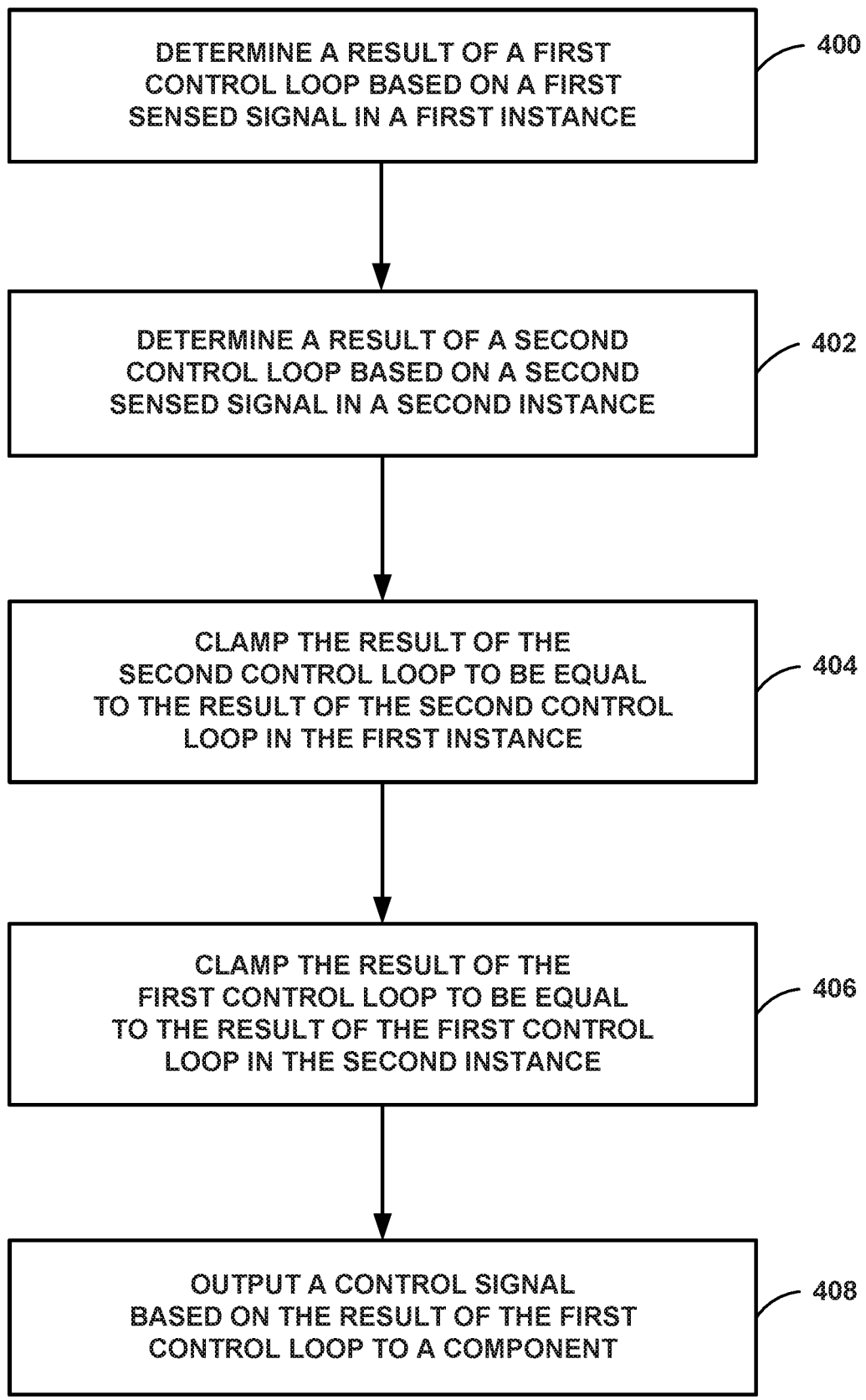
FIG. 4 is a flowchart illustrating an example process implemented by a controller to output a control signal to a component, in accordance with one or more techniques of this disclosure.

FIG. 4 is a flowchart illustrating an example process implemented by a controller to output a control signal to a component, in accordance with one or more techniques of this disclosure. The techniques of FIG. 4 are described with reference to controller 210 shown in FIG. 2, although other components, such as controllers 110 and 310 shown in FIGS. 1 and 3, may implement similar techniques.

In the example of FIG. 4, controller 210 determines result 252A based on sensed signal 260A in a first instance (400). In the first instance, loop switching condition 294 may have a False value, such that controller 210 is configured to determine result 252A based on limits 270 and 272 and the output of multiplier 280A.

In the example of FIG. 4, controller 210 determines result 252B based on sensed signal 260B in a second instance (402). In the second instance, loop switching condition 294 may have a True value, such that controller 210 is configured to determine result 252B based on limits 270 and 272 and the output of multiplier 280B.

In the example of FIG. 4, controller 210 clamps result 252B to equal to result 252A in the first instance (404). Controller 210 may be configured to clamp result 252B by setting the limits for blocks 264B and 266B to be equal to result 252A such that result 252B will be equal to the previous value of result 252A. In the example of FIG. 4, controller 210 clamps result 252A to equal to result 252B in the second instance (406). Controller 210 may be configured to clamp result 252A by setting the limits for blocks 264A and 266A to be equal to result 252B such that result 252A will be equal to the previous value of result 252B.

In the example of FIG. 4, controller 210 outputs a control signal to a component of system 200 based on result 252A (408). Controller 210 may be configured to set the value of the control signal equal to result 252A, or controller 210 may be configured to set the value of the control signal equal to result 252B in some examples. The value of the control signal may be the amplitude, phase, duty cycle, and/or frequency of the control signal.

Figure 5:
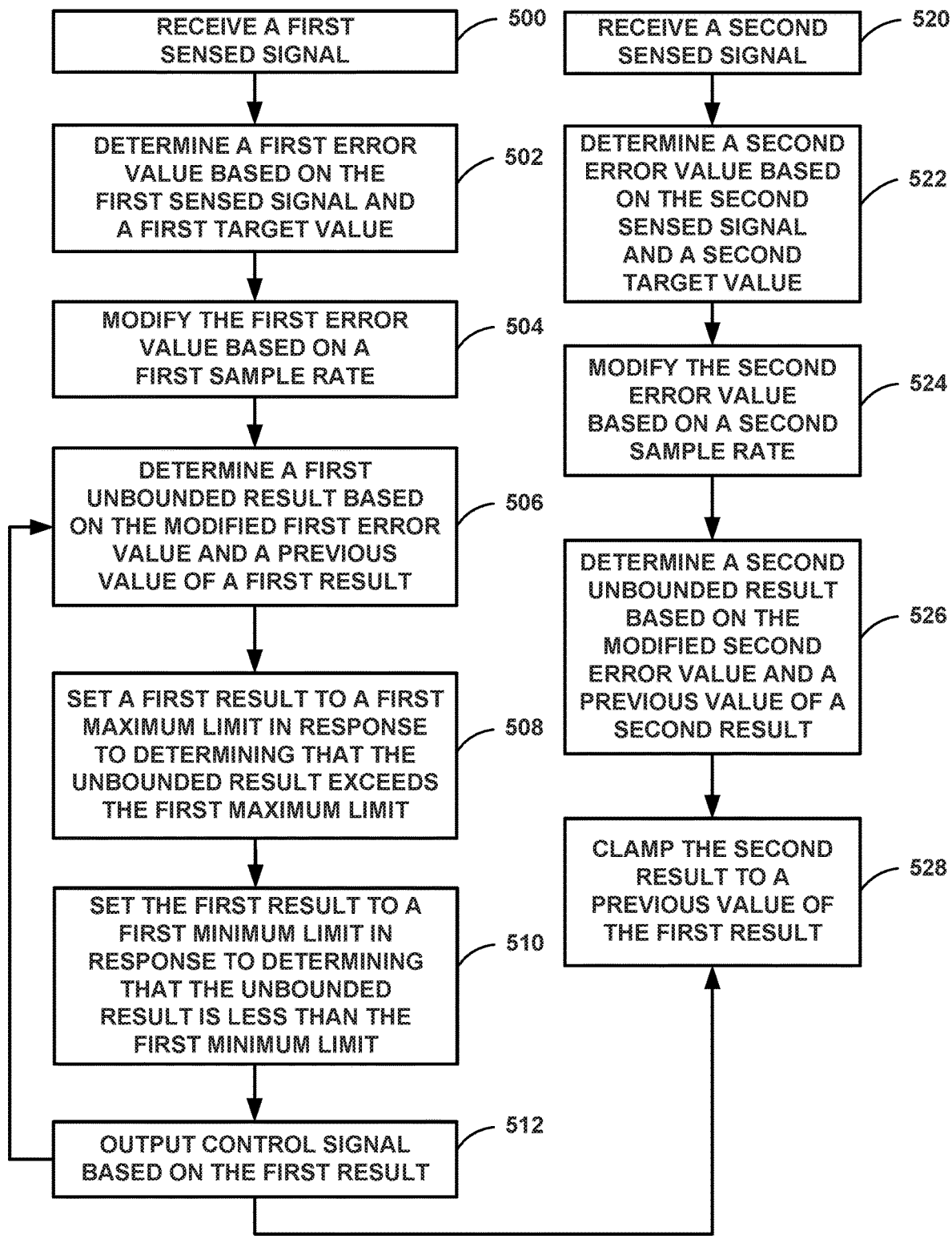
FIG. 5 is a flowchart illustrating an example process implemented by a controller to determine results of two control loops, in accordance with one or more techniques of this disclosure.

FIG. 5 is a flowchart illustrating an example process implemented by a controller to determine results of two control loops, in accordance with one or more techniques of this disclosure. The techniques of FIG. 5 are described with reference to controller 210 shown in FIG. 2, although other components, such as controllers 110 and 310 shown in FIGS. 1 and 3, may implement similar techniques.

In the example of FIG. 5, controller 210 receives sensed signal 260A (500) and determines signal error 284A based on sensed signal 260A and signal demand 288A (502). Signal error 284A is an example of an error value, and signal demand 288A is an example of a target value. Controller 210 (e.g., adder 292A) may be configured to determine signal error 284A by subtracting sensed signal 260A and signal demand 288A and setting signal error 284A equal to the difference between sensed signal 260A and signal demand 288A.

In the example of FIG. 5, controller 210 modifies signal error 284A based on sample rate 282A (504). Controller 210 (e.g., multiplier 280A) may be configured to determine a modified error value at least in part by multiplying signal error 284A and a sample period. The sample period may be equal to the inverse of sample rate 282A. In the example of FIG. 5, controller 210 (e.g., adder 230A) determines a first unbounded result based on the first modified error value outputted at multiplier 280A and a previous value of result 252A (506). In some examples, controller 210 (e.g., adder 230A) is configured to determine the first unbounded result at least in part by adding the first modified error value and the previous value of result 252A.

In the example of FIG. 5, controller 210 (e.g., minimum block 264A) sets result 252A equal to maximum limit 270 in response to determining that the first unbounded result is greater than maximum limit 270 (508). In the example of FIG. 5, controller 210 sets result 252A equal to minimum limit 272 (e.g., maximum block 266A) in response to determining that the first unbounded result is less than minimum limit 272 (510). Thus, controller 210 (e.g., blocks 264A and 266A) may be configured to cap result 252A at limits 270 and 272. In the example of FIG. 5, controller 210 (control loop 220A) outputs a control signal based on result 252A (512).

In the example of FIG. 5, controller 210 (e.g., adder 292B) receives sensed signal 260B (520) and determines signal error 284B based on sensed signal 260B and signal demand 288B (522). Controller 210 (e.g., adder 292B) may be configured to determine signal error 284B by subtracting sensed signal 260B and signal demand 288B and setting signal error 284B equal to the difference between sensed signal 260B and signal demand 288B. In examples in which loop switching condition has a False value, controller 210 may be configured to set signal demand 288B equal to sensed signal 260B, such that signal error 284B is set equal to zero.

In the example of FIG. 5, controller 210 (e.g., multiplier 280B) modifies signal error 284B based on sample rate 282B (524). In the example of FIG. 5, controller 210 (e.g., adder 230B) determines a second unbounded result based on the second modified error value outputted at multiplier 280B and a previous value of result 252B (526). Controller 210 (e.g., adder 230B) may be configured to determine the second unbounded result at least in part by adding the second modified error value and the previous value of result 252B. In the example of FIG. 5, controller 210 (e.g., blocks 264B and 266B of control loop 220B) clamps result 252B to a previous value of result 252A (528). Controller 210 (e.g., blocks 264B and 266B) may be configured to clamp result 252B at least in part by setting the limits.

The following numbered examples demonstrate one or more aspects of the disclosure.

Example 1

A method includes determining, by a controller in a system, a result of a first control loop based on a first sensed signal in a first instance and determining, by the controller, a result of a second control loop based on a second sensed signal in a second instance. The method also includes clamping, by the controller, the result of the second control loop to be equal to the result of the first control loop in the first instance and clamping, by the controller, the result of the first control loop to be equal to the result of the second control loop in the second instance. The method further includes outputting, by the controller and to a component of the system, a control signal based on the result of the first control loop.

Example 2

The method of example 1, further including switching from the first control loop in the first instance to the second control loop in the second instance at least in part by outputting the control signal in a continuous manner such that an amplitude of the control signal is continuous over time with a smooth transition from the first control loop to the second control loop.

Example 3

The method of examples 1-2 or any combination thereof, further including switching from the second control loop in the second instance to the first control loop in the first instance at least in part by outputting the control signal in the continuous manner such that an amplitude of the control signal is continuous over time with a smooth transition from the second control loop to the first control loop.

Example 4

The method of examples 1-3 or any combination thereof, where outputting the control signal in the continuous manner includes outputting the control signal without any resets or jumps.

Example 5

The method of examples 1-4 or any combination thereof, where clamping the result of the second control loop in the first instance includes causing the second control loop to follow the result of first control loop in the first instance.

Example 6

The method of examples 1-5 or any combination thereof, where clamping the result of the first control loop in the second instance includes causing the first control loop to follow the result of second control loop in the second instance.

Example 7

The method of examples 1-6 or any combination thereof, where determining the result of the first control loop in the first instance is based on a minimum value for the control signal and further based on a maximum value for the control signal.

Example 8

The method of examples 1-7 or any combination thereof, where determining the result of the second control loop in the second instance is based on the minimum value for the control signal and further based on the maximum value for the control signal.

Example 9

The method of examples 1-8 or any combination thereof, further including determining a result of a third control loop based on a third sensed signal in a third instance and clamping the result of the third control loop to be equal to the result of the first control loop in the first instance. The method also includes clamping the result of the third control loop to be equal to the result of the second control loop in the second instance and clamping the result of the first control loop to be equal to the result of the third control loop in the third instance. The method includes clamping the result of the second control loop to be equal to the result of the third control loop in the third instance.

Example 10

The method of examples 1-9 or any combination thereof, further including receiving the first sensed signal from a first sensor of the system and receiving the second sensed signal from a second sensor of the system, the second sensor being different than the first sensor.

Example 11

The method of examples 1-10 or any combination thereof, where receiving the first sensed signal includes receiving a signal indicating torque of the component.

Example 12

The method of examples 1-11 or any combination thereof, where receiving the second sensed signal includes receiving a signal indicating speed of the component.

Example 13

The method of examples 1-12 or any combination thereof, further including determining a first error value based on a difference between the first sensed signal and a first target value and determining a second error value based on a difference between the second sensed signal and a second target value.

Example 14

The method of examples 1-13 or any combination thereof, further including determining the result of the first control loop in the first instance is based on the first error value, and determining the result of the second control loop in the second instance is based on the second error value.

Example 15

The method of examples 1-14 or any combination thereof, where determining the result of the first control loop in the first instance includes adding a previous result of the first control loop and the first error value.

Example 16

The method of examples 1-15 or any combination thereof, where determining the result of the second control loop in the second instance includes adding a result of the second control loop and the second error value.

Example 17

The method of examples 1-16 or any combination thereof, where the system includes an engine.

Example 18

The method of examples 1-17 or any combination thereof, where the component of the system includes an actuator of the engine.

Example 19

The method of examples 1-18 or any combination thereof, where outputting the control signal includes outputting the control signal to the actuator.

Example 20

A system includes a component and a controller configured to output a control signal to the component. The system also includes a first sensor configured to communicate a first sensed signal to the controller and a second sensor configured to communicate a second sensed signal to the controller, the second sensor being different than the first sensor. The controller is further configured to determine a result of a first control loop based on the first sensed signal in a first instance and determine a result of a second control loop based on the second sensed signal in a second instance. The controller is also configured to clamp the result of the second control loop to be equal to the result of the first control loop in the first instance and clamp the result of the first control loop to be equal to the result of the second control loop in the second instance. The controller is configured to output the control signal based on the result of the first control loop.

Example 21

The system of example 20, where the controller is further configured to switch from the first control loop in the first instance to the second control loop in the second instance at least in part by outputting the control signal in a continuous manner such that an amplitude of the control signal is continuous over time with a smooth transition from the first control loop to the second control loop.

Example 22

The system of examples 20-21 or any combination thereof, where the controller is also configured to switch from the second control loop in the second instance to the first control loop in the first instance at least in part by outputting the control signal in the continuous manner such that an amplitude of the control signal is continuous over time with a smooth transition from the second control loop to the first control loop.

Example 23

The system of examples 20-22 or any combination thereof, where the controller is configured to output the control signal in the continuous manner at least in part by outputting the control signal without any resets or jumps.

Example 24

The system of examples 20-23 or any combination thereof, where the controller is configured to clamp the result of the second control loop in the first instance at least in part by causing the second control loop to follow the result of first control loop in the first instance.

Example 25

The system of examples 20-24 or any combination thereof, where the controller is configured to clamp the result of the first control loop in the second instance at least in part by causing the first control loop to follow the result of second control loop in the second instance.

Example 26

The system of examples 20-25 or any combination thereof, where the controller is configured to determine the result of the first control loop in the first instance based on a minimum value for the control signal and further based on a maximum value for the control signal.

Example 27

The system of examples 20-26 or any combination thereof, where the controller is configured to determine the result of the second control loop in the second instance based on the minimum value for the control signal and further based on the maximum value for the control signal.

Example 28

The system of examples 20-27 or any combination thereof, further including a third sensor configured to communicate a third sensed signal to the controller, where the controller is further configured to determine a result of a third control loop based on the third sensed signal in a third instance. The controller is also configured to clamp the result of the third control loop to be equal to the result of the first control loop in the first instance and clamp the result of the third control loop to be equal to the result of the second control loop in the second instance. The controller is configured to clamp the result of the first control loop to be equal to the result of the third control loop in the third instance and clamp the result of the second control loop to be equal to the result of the third control loop in the third instance.

Example 29

The system of examples 20-28 or any combination thereof, further including an engine including the controller and the component.

Example 30

The system of examples 20-29 or any combination thereof, where the component includes an actuator of the engine.

Example 31

The system of examples 20-30 or any combination thereof, where the controller is configured to output the control signal at least in part by outputting the control signal to the actuator.

Example 32

A device includes a computer-readable medium having executable instructions stored thereon, configured to be executable by processing circuitry for causing the processing circuitry to determine a result of a first control loop based on a first sensed signal in a first instance and determine a result of a second control loop based on a second sensed signal in a second instance. The instructions further cause the processing circuitry to clamp the result of the second control loop to be equal to the result of the first control loop in the first instance and clamp the result of the first control loop to be equal to the result of the second control loop in the second instance. The instructions also cause the processing circuitry to output a control signal based on the result of the first control loop.

Example 33

The device of example 32, wherein the instructions further cause the processing circuitry to switch from the first control loop in the first instance to the second control loop in the second instance at least in part by outputting the control signal in a continuous manner such that an amplitude of the control signal is continuous over time with a smooth transition from the first control loop to the second control loop.

Example 34

The device of examples 32-33 or any combination thereof, where the instructions also cause the processing circuitry to switch from the second control loop in the second instance to the first control loop in the first instance at least in part by outputting the control signal in the continuous manner such that an amplitude of the control signal is continuous over time with a smooth transition from the second control loop to the first control loop.

Example 35

The device of examples 32-34 or any combination thereof, wherein the instructions further cause the processing circuitry to perform the method of examples 1-19 or any combination thereof.

Various examples have been described. These and other examples are within the scope of the following claims.

What is claimed is:
1. A method comprising:
   determining, by a controller in a system, a result of a first control loop based on a first sensed signal in a first instance, wherein determining the result of the first control loop in the first instance is based on a minimum value for a control signal and further based on a maximum value for the control signal;

determining, by the controller, a result of a second control loop based on a second sensed signal in a second instance, wherein determining the result of the second control loop in the second instance is based on the minimum value for the control signal and further based on the maximum value for the control signal;

clamping, by the controller, the result of the second control loop to be equal to the result of the first control loop in the first instance;

clamping, by the controller, the result of the first control loop to be equal to the result of the second control loop in the second instance; and outputting, by the controller and to a component of the system, the control signal based on the result of the first control loop.

2. The method of claim 1, further comprising:
switching from the first control loop in the first instance to the second control loop in the second instance at least in part by outputting the control signal in a continuous manner such that an amplitude of the control signal is continuous over time with a smooth transition from the first control loop to the second control loop; and switching from the second control loop in the second instance to the first control loop in the first instance at least in part by outputting the control signal in the continuous manner such that an amplitude of the control signal is continuous over time with a smooth transition from the second control loop to the first control loop.

3. The method of claim 2, wherein outputting the control signal in the continuous manner comprises outputting the control signal without any resets or jumps.

4. The method of claim 1,
wherein clamping the result of the second control loop in the first instance comprises causing the second control loop to follow the result of first control loop in the first instance, and wherein clamping the result of the first control loop in the second instance comprises causing the first control loop to follow the result of second control loop in the second instance.

5. The method of claim 1, further comprising:
determining a result of a third control loop based on a third sensed signal in a third instance;
clamping the result of the third control loop to be equal to the result of the first control loop in the first instance;
clamping the result of the third control loop to be equal to the result of the second control loop in the second instance;
clamping the result of the first control loop to be equal to the result of the third control loop in the third instance; and
clamping the result of the second control loop to be equal to the result of the third control loop in the third instance.

6. The method of claim 1, further comprising:
receiving the first sensed signal from a first sensor of the system; and
receiving the second sensed signal from a second sensor of the system, the second sensor being different than the first sensor.

7. The method of claim 6,
wherein receiving the first sensed signal comprises receiving a signal indicating torque of the component, and wherein receiving the second sensed signal comprises receiving a signal indicating speed of the component.

8. The method of claim 1, further comprising:
determining a first error value based on a difference between the first sensed signal and a first target value; and
determining a second error value based on a difference between the second sensed signal and a second target value,
wherein determining the result of the first control loop in the first instance is based on the first error value, and
wherein determining the result of the second control loop in the second instance is based on the second error value.

9. The method of claim 8,
wherein determining the result of the first control loop in the first instance comprises adding a previous result of the first control loop and the first error value, and
wherein determining the result of the second control loop in the second instance comprises adding a result of the second control loop and the second error value.

10. The method of claim 1,
wherein the system comprises an engine,
wherein the component of the system comprises an actuator of the engine, and
wherein outputting the control signal comprises outputting the control signal to the actuator.

11. A system comprising:
a component;
a controller configured to output a control signal to the component;
a first sensor configured to communicate a first sensed signal to the controller; and
a second sensor configured to communicate a second sensed signal to the controller, the second sensor being different than the first sensor,
wherein the controller is further configured to:
determine a result of a first control loop based on the first sensed signal in a first instance and further based on a minimum value for the control signal and further based on a maximum value for the control signal;
determine a result of a second control loop based on the second sensed signal in a second instance and further based on the minimum value for the control signal and further based on the maximum value for the control signal;
clamp the result of the second control loop to be equal to the result of the first control loop in the first instance;
clamp the result of the first control loop to be equal to the result of the second control loop in the second instance; and
output the control signal based on the result of the first control loop.

12. The system of claim 11, wherein the controller is further configured to:
switch from the first control loop in the first instance to the second control loop in the second instance at least in part by outputting the control signal in a continuous manner such that an amplitude of the control signal is continuous over time with a smooth transition from the first control loop to the second control loop; and
switch from the second control loop in the second instance to the first control loop in the first instance at least in part by outputting the control signal in the continuous manner such that an amplitude of the control signal is continuous over time with a smooth transition from the second control loop to the first control loop.

13. The system of claim 12, wherein the controller is configured to output the control signal in the continuous manner at least in part by outputting the control signal without any resets or jumps.

14. The system of claim 11,
wherein the controller is configured to clamp the result of the second control loop in the first instance at least in part by causing the second control loop to follow the result of first control loop in the first instance, and
wherein the controller is configured to clamp the result of the first control loop in the second instance at least in part by causing the first control loop to follow the result of second control loop in the second instance.

15. The system of claim 11, further comprising a third sensor configured to communicate a third sensed signal to the controller, wherein the controller is further configured to:
determine a result of a third control loop based on the third sensed signal in a third instance;
clamp the result of the third control loop to be equal to the result of the first control loop in the first instance;
clamp the result of the third control loop to be equal to the result of the second control loop in the second instance;
clamp the result of the first control loop to be equal to the result of the third control loop in the third instance; and
clamp the result of the second control loop to be equal to the result of the third control loop in the third instance.

16. The system of claim 11, further comprising an engine including the controller and the component,
wherein the component comprises an actuator of the engine, and
wherein the controller is configured to output the control signal at least in part by outputting the control signal to the actuator.

17. A device comprising a computer-readable medium having executable instructions stored thereon, configured to be executable by processing circuitry for causing the processing circuitry to:
determine a result of a first control loop based on a first sensed signal in a first instance and further based on a minimum value for a control signal and further based on a maximum value for the control signal;
determine a result of a second control loop based on a second sensed signal in a second instance and further based on the minimum value for the control signal and further based on the maximum value for the control signal;
clamp the result of the second control loop to be equal to the result of the first control loop in the first instance;
clamp the result of the first control loop to be equal to the result of the second control loop in the second instance; and
output the control signal based on the result of the first control loop.

18. The device of claim 17, wherein the instructions further cause the processing circuitry to:
switch from the first control loop in the first instance to the second control loop in the second instance at least in part by outputting the control signal in a continuous manner such that an amplitude of the control signal is continuous over time with a smooth transition from the first control loop to the second control loop; and
switch from the second control loop in the second instance to the first control loop in the first instance at least in part by outputting the control signal in the continuous manner such that an amplitude of the control signal is continuous over time with a smooth transition from the second control loop to the first control loop.

19. The device of claim 17, wherein the instructions to output the control signal in the continuous manner comprise instructions to output the control signal without any resets or jumps.

20. The device of claim 17,
wherein the instructions to clamp the result of the second control loop in the first instance comprise instructions to cause the second control loop to follow the result of first control loop in the first instance, and
wherein the instructions to clamp the result of the first control loop in the second instance comprise instructions to cause the first control loop to follow the result of second control loop in the second instance.

* * * * *